US012319809B2

(12) United States Patent
Chun et al.

(10) Patent No.: US 12,319,809 B2
(45) Date of Patent: *Jun. 3, 2025

(54) VINYL ALCOHOL BASED COPOLYMER, METHOD FOR PREPARING THE SAME AND GAS BARRIER FILM COMPRISING THE SAME

(71) Applicant: LG Chem, Ltd., Seoul (KR)

(72) Inventors: Moon Seok Chun, Daejeon (KR); Kyung An Kwon, Daejeon (KR)

(73) Assignee: LG Chem, Ltd., Seoul (KR)

(*) Notice: Subject to any disclaimer, the term of this patent is extended or adjusted under 35 U.S.C. 154(b) by 0 days.

This patent is subject to a terminal disclaimer.

(21) Appl. No.: 18/391,068

(22) Filed: Dec. 20, 2023

(65) Prior Publication Data

US 2024/0124701 A1   Apr. 18, 2024

Related U.S. Application Data

(63) Continuation of application No. 17/049,077, filed as application No. PCT/KR2020/001017 on Jan. 21, 2020, now Pat. No. 11,905,403.

(30) Foreign Application Priority Data

Jan. 22, 2019 (KR) ................. 10-2019-0008233
Jan. 20, 2020 (KR) ................. 10-2020-0007547

(51) Int. Cl.
| C08L 29/04 | (2006.01) |
| C08F 8/12 | (2006.01) |
| C08F 8/30 | (2006.01) |
| C08F 210/02 | (2006.01) |
| C08F 210/06 | (2006.01) |
| C08F 210/08 | (2006.01) |
| C08F 210/14 | (2006.01) |
| C08F 216/06 | (2006.01) |
| C08F 218/08 | (2006.01) |
| C08F 220/42 | (2006.01) |
| C08K 3/22 | (2006.01) |

(52) U.S. Cl.
CPC ............. *C08L 29/04* (2013.01); *C08F 8/12* (2013.01); *C08F 210/02* (2013.01); *C08F 210/06* (2013.01); *C08F 210/08* (2013.01); *C08F 210/14* (2013.01); *C08F 216/06* (2013.01); *C08F 218/08* (2013.01); *C08F 220/42* (2013.01); *C08K 3/22* (2013.01); *C08F 8/30* (2013.01); *C08F 2800/10* (2013.01); *C08L 2201/14* (2013.01); *C08L 2203/16* (2013.01)

(58) Field of Classification Search
CPC .... C08L 29/04; C08L 2201/14; C08F 216/06; C08F 8/12; C08F 218/08; C08F 8/30
See application file for complete search history.

(56) References Cited

U.S. PATENT DOCUMENTS

| 2,341,553 | A | 2/1944 | Houtz |
| 4,413,090 | A | 11/1983 | Shoji et al. |
| 4,746,700 | A | 5/1988 | Takida |
| 4,931,500 | A | 6/1990 | Okamoto et al. |
| 6,232,382 | B1 | 5/2001 | Ninomiya et al. |
| 2002/0026019 | A1 | 2/2002 | Yanagida |
| 2002/0055579 | A1 | 5/2002 | Oshita et al. |
| 2003/0157283 | A1 | 8/2003 | Tai et al. |
| 2004/0096683 | A1 | 5/2004 | Ikeda et al. |
| 2007/0225421 | A1 | 9/2007 | Origuchi et al. |
| 2008/0214764 | A1 | 9/2008 | Watanabe et al. |
| 2014/0213701 | A1 | 7/2014 | Nonaka et al. |
| 2016/0319048 | A1 | 11/2016 | Kato et al. |
| 2017/0183493 | A1 | 6/2017 | Okamoto |
| 2018/0346620 | A1 | 12/2018 | Hori et al. |
| 2019/0010305 | A1 | 1/2019 | Nishimura et al. |
| 2019/0085102 | A1 | 3/2019 | Han et al. |
| 2019/0100610 | A1 | 4/2019 | Sato |
| 2019/0300627 | A1 | 10/2019 | Nishimura et al. |

FOREIGN PATENT DOCUMENTS

| CN | 1266071 A | 9/2000 |
| CN | 1338485 A | 3/2002 |
| CN | 1528799 A | 9/2004 |

(Continued)

OTHER PUBLICATIONS

Machine translation of JP-2007031725-A obtained from Espacenet (Year: 2007).*
Search report from International Application No. PCT/KR2020/001017, mailed Apr. 29, 2020.
Extended European Search Report including Written Opinion for Application No. 20745542.9 dated Jun. 29, 2021, 6 pages.
Search Report dated Aug. 9, 2022 from the Office Action for Chinese Application No. 202080002078.0 issued Aug. 17, 2022, pp. 1-4.

(Continued)

*Primary Examiner* — Kregg T Brooks
*Assistant Examiner* — David R. Foss
(74) *Attorney, Agent, or Firm* — Lerner David LLP

(57) ABSTRACT

In the present disclosure, there are provided a vinyl alcohol-based copolymer including a first repeating unit derived from an olefin, a second repeating unit containing a hydroxyl group, and a third repeating unit containing a cyanoalkyloxy group formed by a reaction of the repeating unit containing a hydroxyl group and an unsaturated nitrile-based compound, wherein the third repeating unit is included in an amount of 2 mol % or more and less than 10 mol % with respect to 100 mol % of a total amount of the second repeating unit and the third repeating unit; a method for preparing the same; and a gas barrier film including the same. The vinyl alcohol-based copolymer has excellent moisture stability, thereby exhibiting excellent gas barrier properties even in a humid environment.

5 Claims, No Drawings

(56) References Cited

FOREIGN PATENT DOCUMENTS

| | | | |
|---|---|---|---|
| CN | 101010347 A | | 8/2007 |
| CN | 102942645 A | | 2/2013 |
| CN | 103635526 A | | 3/2014 |
| CN | 106029713 A | | 10/2016 |
| CN | 108137821 A | | 6/2018 |
| CN | 108431054 A | | 8/2018 |
| JP | S57165406 A | | 10/1982 |
| JP | 2597960 B2 | | 4/1997 |
| JP | H09249783 A | | 9/1997 |
| JP | H11199607 A | | 7/1999 |
| JP | 2002138109 A | | 5/2002 |
| JP | 2003320600 A | | 11/2003 |
| JP | 2007031725 A | * | 2/2007 |
| JP | 2015093389 A | | 5/2015 |
| KR | 101213523 B1 | | 12/2012 |
| KR | 20160118287 A | | 10/2016 |
| KR | 20170095024 A | | 8/2017 |
| KR | 20180075912 A | | 7/2018 |
| RU | 2010104072 A | | 8/2011 |
| RU | 2436803 C2 | | 12/2011 |
| WO | 02092643 A1 | | 11/2002 |

OTHER PUBLICATIONS

Li, X., Goh, S.H., Lai, Y.H. and Deng, S.-M. (1999), Synthesis and hydrolysis of b-cyanoethyl ether of poly(vinyl alcohol). J. Appl. Polym. Sci., 73: 2771-2777. (Year: 1999).

* cited by examiner

VINYL ALCOHOL BASED COPOLYMER, METHOD FOR PREPARING THE SAME AND GAS BARRIER FILM COMPRISING THE SAME

CROSS-REFERENCE TO RELATED APPLICATION(S)

This application is a continuation application of U.S. applicant Ser. No. 17/049,077 filed on Oct. 20, 2020, a national phase entry under 35 U.S.C. § 371 of International Application No. PCT/KR2020/001017 filed on Jan. 21, 2020, which claims priority from Korean Patent Application No. 10-2019-0008233 filed on Jan. 22, 2019, and Korean Patent Application No. 10-2020-0007547 filed on Jan. 20, 2020, all of which are incorporated herein by reference.

TECHNICAL FIELD

The present disclosure relates to a vinyl alcohol-based copolymer exhibiting high gas barrier properties with reduced permeation of moisture, a method for preparing the same and a gas barrier film including the same.

BACKGROUND ART

Saponified products of vinyl alcohol-based copolymers represented by ethylene-vinyl acetate copolymers are used in various applications such as films, sheets, and containers due to excellent gas barrier properties.

The conventional gas barrier film using a saponified product of ethylene vinyl acetate copolymer is produced by preparing a copolymer of ethylene and vinyl acetate and then hydrolyzing it. The film produced by the above method includes a vinyl alcohol-based polymer such as ethylene vinyl alcohol copolymer (EVOH) prepared by hydrolysis of ethylene vinyl acetate copolymer, and the vinyl alcohol-based polymer is crystallized by hydrogen bonding between hydroxyl groups contained in the molecule, thereby exhibiting gas barrier properties. The vinyl alcohol-based polymer exhibits high gas barrier properties in dry conditions, but in humid conditions, it absorbs moisture by water vapor or the like and there is a problem in that gas permeability rapidly increases as the hydrogen bond becomes loose.

Various methods have been proposed to solve this problem. Specifically, in Japanese Patent Laid-Open No. 2015-093389 (Patent Document 1), a method for preservation in a humid environment by modifying a saponified product of modified ethylene-vinyl ester-based copolymer with caprolactone or the like is disclosed. In addition, a vinyl alcohol-based polymer composition having improved gas barrier properties in a humid environment by introducing a metal alkoxide such as tetramethoxysilane as a functional group, a coating agent and a laminate including the same are disclosed in Japanese Patent Laid-Open No. 2002-138109 (Patent Document 2).

In addition, U.S. Pat. No. 4,746,700 (Patent Document 3) discloses a film material having transparency with gas barrier properties by reducing a content of the copolymer when preparing the vinyl alcohol copolymer.

However, the proposed methods were not sufficient to prevent the gas barrier properties of the gas barrier film from deteriorating in the humid environment.

DETAILED DESCRIPTION OF THE PRESENT DISCLOSURE

Technical Problem

In the present disclosure, there are provided a vinyl alcohol-based copolymer exhibiting high gas barrier properties with reduced permeation of moisture, and a method for preparing the same.

In the present disclosure, there are also provided a composition for forming a gas barrier film and a gas barrier film exhibiting excellent gas barrier properties even in a humid environment by including the vinyl alcohol-based copolymer.

Technical Solution

In order to solve the above problems, there is provided a vinyl alcohol-based copolymer including a first repeating unit derived from an olefin; a second repeating unit represented by the following Chemical Formula 1 containing a hydroxyl group; and a third repeating unit represented by the following Chemical Formula 2 containing a cyanoalkyloxy group;

wherein the third repeating unit is included in an amount of 2 mol % or more and less than 10 mol % with respect to 100 mol % of a total amount of the second repeating unit and the third repeating unit:

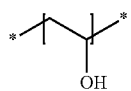

[Chemical Formula 1]

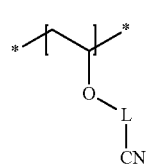

[Chemical Formula 2]

(In Chemical Formula 2, L is $C_{1-10}$ alkylene.)

According to another embodiment of the present disclosure, there is also provided a method for preparing the vinyl alcohol-based copolymer including the step of: performing hydrolysis by a saponification reaction by adding a basic substance to a copolymer of an olefin-vinyl carboxylate-based compound, wherein an unsaturated nitrile-based compound is added when the saponification reaction proceeds at least 95%, and reacted such that a cyanoalkyl substitution ratio according to the following Equation 1 is 2 mol % or more and less than 10 mol %:

Cyanoalkyl substitution ratio=[(mol % of third repeating unit)/(mol % of second repeating unit+mol % of third repeating unit)]×100  [Equation 1]

in Equation 1, the mol % of second repeating unit and the mol % of third repeating unit are values based on 100 mol % of a total amount of repeating units in the vinyl alcohol-based copolymer.

According to another embodiment of the present disclosure, there are also provided a composition for forming a gas barrier film including the vinyl alcohol-based copolymer and a gas barrier film prepared using the same.

Advantageous Effects

The vinyl alcohol-based copolymer according to the present disclosure may exhibit excellent gas barrier properties even in a humid environment by bonding a cyanoalkyl group which exhibits moisture stability, to the side chain and thus reducing permeation of moisture. Accordingly, the above-mentioned vinyl alcohol-based copolymer is useful as a gas barrier film.

DETAILED DESCRIPTION OF THE BEST EMBODIMENTS

The terminology used herein is for the purpose of describing particular embodiments only and is not intended to be limiting of the invention. The singular forms are intended to include the plural forms as well, unless the context clearly indicates otherwise. It will be further understood that the terms "include", "have", or "possess" when used in this specification, specify the presence of stated features, steps, components, or combinations thereof, but do not preclude the presence or addition of one or more other features, steps, components, or combinations thereof.

As the present invention can be variously modified and have various forms, specific embodiments thereof are shown by way of examples and will be described in detail. However, it is not intended to limit the present invention to the particular form disclosed and it should be understood that the present invention includes all modifications, equivalents, and replacements within the idea and technical scope of the present invention.

Hereinafter, the vinyl alcohol-based copolymer, the method for preparing the same, and the gas barrier film prepared using the same according to specific embodiments of the present disclosure will be described in more detail.

The conventional gas barrier film using a vinyl alcohol-based copolymer represented by a saponified product of an ethylene-vinyl acetate copolymer was prepared in the form of a film using a vinyl alcohol-based copolymer prepared by copolymerizing an olefin such as ethylene with a vinyl carboxylate-based compound such as vinyl acetate, and then hydrolyzing it with a basic substance.

However, in the present disclosure, a cyanoalkyl group is introduced to the side chain of the vinyl alcohol-based copolymer to be prepared by adding and reacting an unsaturated nitrile-based compound such as acrylonitrile when the saponification reaction of the copolymer of an olefin and a vinyl carboxylate-based compound proceeds at least 95%. As a result, the vinyl alcohol-based copolymer to be prepared has increased moisture stability, and thus reduced permeation of moisture during film production, thereby exhibiting excellent gas barrier properties even in a humid environment.

Specifically, the vinyl alcohol-based copolymer according to one embodiment of the present disclosure may be prepared by a Michael addition reaction between an unsaturated nitrile-based compound represented by acrylonitrile and a polymer containing a hydroxyl group in the molecule, and the polymer containing a hydroxyl group may be, for example, a polymer (EVA-ONa) produced by a hydrolysis reaction of an ethylene-vinyl acetate copolymer.

The EVA-ONa is an intermediate in which a copolymer of ethylene and vinyl acetate is hydrolyzed in the presence of a sodium hydroxide catalyst which is a basic substance.

Since it exists as a salt of an oxy anion and a sodium cation derived from sodium hydroxide, it can easily bind with acrylonitrile.

More specifically, the vinyl alcohol-based copolymer of one embodiment of the present disclosure may be prepared including the steps of copolymerizing an olefin with a vinyl carboxylate-based compound to prepare a copolymer of an olefin-vinyl carboxylate-based compound; and performing hydrolysis by a saponification reaction by adding a basic substance to the copolymer of an olefin-vinyl carboxylate-based compound, wherein an unsaturated nitrile-based compound is added when the saponification reaction proceeds at least 95%, and then reacted.

Accordingly, the vinyl alcohol-based copolymer according to one embodiment of the present disclosure may be a ternary copolymer including the repeating unit (first repeating unit) derived from an olefin, the repeating unit containing a hydroxyl group (second repeating unit) derived from a vinyl carboxylate-based compound, and a repeating unit containing a cyanoalkyloxy group (third repeating unit) produced by reacting an unsaturated nitrile-based compound with the second repeating unit containing the hydroxyl group, or a quaternary copolymer further including a repeating unit (fourth repeating unit) derived from a vinyl carboxylate-based compound that does not participate in the saponification reaction, in addition to the above-described repeating units.

The first repeating unit is a repeating unit derived from an olefinic monomer having 2 to 20 carbon atoms, or 2 to 10 carbon atoms such as ethylene, propylene, butylene, pentene, hexene, or octene. It may increase mechanical properties and hydrophobicity of the vinyl alcohol-based copolymer, thereby reducing hygroscopicity.

Specifically, the first repeating unit may include an ethylene-derived repeating unit, and optionally further include at least one repeating unit derived from an olefinic monomer having 3 to 20 carbon atoms or 3 to 10 carbon atoms such as propylene, butylene, pentene, hexene, or octene.

When controlling the content of the olefin-derived repeating unit, mechanical properties and hydrophobicity of the vinyl alcohol-based copolymer can be increased. Specifically, the first repeating unit may be included in an amount of 10 to 70 mol % with respect to 100 mol % of a total amount of repeating units constituting the copolymer. If the content of the olefin-derived repeating unit is less than 10 mol %, there is a possibility of deteriorating mechanical properties and increasing hygroscopicity, and if it exceeds 70 mol %, there is a possibility of deterioration in gas barrier properties. More specifically, it may be included in an amount of 10 mol % or more, 15 mol % or more, 20 mol % or more, or 25 mol % or more, and 70 mol % or less, 50 mol % or less, or 45 mol % or less.

In the present disclosure, the content of the olefin-derived repeating unit in the copolymer may be calculated from the result of 1H-nuclear magnetic resonance spectroscopy (1H-NMR) analysis. Specifically, after dissolving a sample in a tetrahydrofuran solvent (THF-d8), 1H spectrum is measured at room temperature, and the content of the olefin-derived repeating unit is calculated from the results, using a Bruker Avance III HD 700 Mhz 1H-NMR analyzer.

In addition, in the vinyl alcohol-based copolymer according to one embodiment of the present disclosure, the second repeating unit containing a hydroxyl group is a structural unit formed as a result of saponification of a repeating unit derived from a vinyl carboxylate-based compound such as vinyl acetate, and increases gas barrier properties of the vinyl alcohol-based copolymer.

The vinyl carboxylate-based compound may be specifically a vinyl carboxylate-based compound having 4 to 10 carbon atoms such as vinyl acetate, vinyl propionate, or 2-methyl vinyl propionate, and vinyl acetate is more preferable. When the vinyl carboxylate is vinyl acetate, the second repeating unit of the vinyl alcohol structure may have a structure represented by Chemical Formula 1 below.

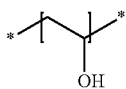

[Chemical Formula 1]

The second repeating unit may be included in an amount of 25 to 85 mol % with respect to 100 mol % of a total amount of repeating units constituting the vinyl alcohol-based copolymer. If the content of the repeating unit containing a hydroxyl group is less than 25 mol %, there is a possibility of deterioration in gas barrier properties, and if it exceeds 85 mol %, there is a possibility of deterioration in gas barrier properties in a humid environment due to increased hygroscopicity and film processing may be difficult. More specifically, it may be included in an amount of 25 mol % or more, 45 mol % or more, or 60 mol % or more, and 85 mol % or less, 80 mol % or less, or 75 mol % or less.

In the present disclosure, the content of the repeating unit containing a hydroxyl group in the copolymer may be calculated from the result of 1H-nuclear magnetic resonance spectroscopy analysis as described above. Specifically, after dissolving a sample in a tetrahydrofuran solvent (THF-d8), 1H spectrum is measured at room temperature, and the content of the repeating unit containing a hydroxyl group is calculated from the results, using a Bruker Avance III HD 700 Mhz 1H-NMR analyzer.

In addition, in the vinyl alcohol-based copolymer according to one embodiment of the present disclosure, the third repeating unit is a repeating unit formed by bonding a cyanoalkyl group as a result of the reaction of an unsaturated nitrile-based compound with the second repeating unit containing the hydroxyl group. Examples of the unsaturated nitrile-based compound include acrylonitrile, methacrylonitrile, 1-cyanopropene, and 3-cyanopropene, and any one or a mixture of two or more thereof may be used.

Specifically, the repeating unit of Chemical Formula 3 may be represented by Chemical Formula 2 below:

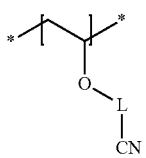

[Chemical Formula 2]

in Chemical Formula 2, L may be $C_{1-10}$ alkylene, more specifically $C_{2-6}$ alkylene, and more specifically $C_{2-3}$ alkylene such as ethylene, 1-methylethylene, or n-propylene.

For example, when acrylonitrile is used, the third repeating unit may have a cyanoethyl group-containing structure represented by Chemical Formula 2-1 below.

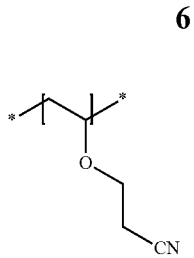

[Chemical Formula 2-1]

The third repeating unit increases moisture stability of the copolymer due to the cyanoalkyl group bonded at the terminal, thereby preventing gas barrier properties from being deteriorated in a humid environment.

In addition, such an effect can be further enhanced by controlling the content of the third repeating unit or controlling a substitution ratio by a cyanoalkyl group (or cyanoalkylation). The cyanoalkyl substitution ratio, that is, a ratio of the repeating unit substituted with the cyanoalkyl group to the repeating unit containing a hydroxyl group included in the copolymer before being substituted with the cyanoalkyl group, is a content (mol %) of the third repeating unit with respect to 100 mol % of a total amount of the second repeating unit and the third repeating unit in the vinyl alcohol-based copolymer to be finally produced, and can be calculated according to Equation 1 below. Specifically, the cyanoalkyl substitution ratio of the vinyl alcohol-based copolymer, that is, the content of the third repeating unit with respect to 100 mol % of a total amount of the second repeating unit and the third repeating unit may be 2 mol % or more and less than 10 mol %. If the cyanoalkyl substitution ratio is less than 2 mol %, moisture blocking effect is weak, and if it is 10 mol % or more, there is a possibility that gas barrier properties are rather lowered. More specifically, it may be 2.5 mol % or more, or 3 mol % or more, and 9 mol % or less, or 8 mol % or less.

Cyanoalkyl substitution ratio=[(mol % of third repeating unit)/(mol % of second repeating unit+mol % of third repeating unit)]×100     [Equation 1]

In Equation 1, the mol % of the second repeating unit and the mol % of the third repeating unit are values based on 100 mol % of a total amount of repeating units in the vinyl alcohol-based copolymer to be finally produced.

In the present disclosure, the cyanoalkyl substitution ratio of the vinyl alcohol-based copolymer may be derived by obtaining a nitrogen content by the Kjeldahl method, and calculating the content of the third repeating unit in the copolymer and the cyanoalkyl substitution ratio from the value of the nitrogen content.

Meanwhile, the vinyl alcohol-based polymer according to one embodiment of the present disclosure may further include a fourth repeating unit derived from a vinyl carboxylate-based compound in which no saponification reaction has occurred.

When the fourth repeating unit derived from a vinyl carboxylate-based compound is further included, processability can be improved. However, if the content thereof exceeds 1 mol % with respect to 100 mol % of a total amount of the repeating units constituting the copolymer, that is, the first, second, third, and fourth repeating units, there is a possibility of deterioration in gas barrier properties. Accordingly, the fourth repeating unit may be included in an amount of 1 mol % or less, more specifically 0.1 mol % or more, and 1 mol % or less or 0.5 mol % or less with respect to 100 mol % of the total amount of the repeating units constituting the copolymer.

In the present disclosure, the content of the fourth repeating unit derived from a vinyl carboxylate-based compound may be calculated from the result of 1H-nuclear magnetic resonance spectroscopy analysis as described above.

The above-described vinyl alcohol-based copolymer according to one embodiment of the present disclosure including the repeating structure may have improved moisture stability by including a cyanoalkyl group at the side chain, and as a result, it is possible to exhibit excellent gas barrier properties even in a humid environment by reducing permeation of moisture during film production.

According to another embodiment of the present disclosure, there is provided a method for preparing the vinyl alcohol-based copolymer.

The method includes the step of performing hydrolysis by a saponification reaction by adding a basic substance to a copolymer of an olefin-vinyl carboxylate-based compound, wherein an unsaturated nitrile-based compound is added when the saponification reaction proceeds at least 95%, and reacted such that a cyanoalkyl substitution ratio according to the following Equation 1 is 2 mol % or more and less than 10 mol %.

Cyanoalkyl substitution ratio=[(mol % of third repeating unit)/(mol % of second repeating unit+mol % of third repeating unit)]×100  [Equation 1]

in Equation 1, the mol % of second repeating unit and the mol % of third repeating unit are values based on 100 mol % of a total amount of repeating units in the vinyl alcohol-based copolymer.

First, a copolymer of an olefin-vinyl carboxylate-based compound is prepared to prepare a vinyl alcohol-based copolymer according to one embodiment of the present disclosure.

The copolymer of an olefin-vinyl carboxylate-based compound may be prepared by a polymerization reaction between an olefin and a vinyl carboxylate-based compound, and accordingly, the method may further include the step of preparing a copolymer of an olefin-vinyl carboxylate-based compound by polymerizing an olefin and a vinyl carboxylate-based compound before the hydrolysis step for the copolymer of an olefin-vinyl carboxylate-based compound. The olefin and the vinyl carboxylate-based compound are as described above.

The polymerization reaction of the olefin and the vinyl carboxylate-based compound may be performed according to a conventional method, and specifically, may be performed using a radical initiator in a solvent.

In addition, in the polymerization, the input amount of the olefin and the vinyl carboxylate-based compound may be determined in consideration of the content of the repeating unit derived from each compound in the copolymer to be finally prepared. For example, they may be included in a molar ratio of 5:95 to 40:60, and more specifically, 7:93 to 30:70. In addition, hygroscopicity of the polymer may be lowered to prevent gas barrier properties from being deteriorated in a humid environment by optimizing the content of the olefin-derived repeating unit in the copolymer of an olefin-vinyl carboxylate-based compound prepared.

In addition, the initiator may be a radical initiator, and examples thereof include azo compounds such as 2,2'-azobis-(2,4-dimethylvaleronitrile), 2,2'-azobisisobutyronitrile, 2,2'-azobis-(4-methoxy-2,4-dimethylvaleronitrile) and 2,2'-azobis-(2-methyl isobutyrate); peroxy-di-carbonates such as bis-(4-t-butyl cyclohexyl) peroxy-di-carbonate, di-cyclohexyl peroxy-di-carbonate, bis(2-ethylhexyl) di-sec-butylperoxy-di-carbonate, and di-isopropylperoxy-di-carbonate; and per-oxides such as acetyl peroxide, lauroyl peroxide, di-lauroyl peroxide, di-decanoyl peroxide, and di-octanoyl peroxide. Any one or a mixture of two or more thereof may be used.

The initiator may be added in a molar ratio of 0.001 to 1 with respect to 100 mol of a total amount of monomers including the olefin and the vinyl carboxylate-based compound. More specifically, the molar ratio may be 0.001 or more, or 0.01 or more, and 1 or less, or 0.1 or less. When the initiator is added within the above range, a polymer can be prepared with better efficiency.

In addition, a solvent having a high solubility with respect to the monomer compound may be used as the solvent. Specifically, examples thereof include alcohols such as methyl alcohol, ethyl alcohol, propyl alcohol, isopropyl alcohol, t-butyl alcohol, and n-pentyl alcohol; ketones such as methyl ethyl ketone and acetone; and sulfoxides such as dimethyl sulfoxide, and any one or a mixture of two or more thereof may be used. Among these, alcohols having better solubility may be used, and more specifically, t-butyl alcohol may be used.

The solvent may be added in an amount of 30 to 60 parts by weight based on 100 parts by weight of a total amount of monomers including the olefin and the vinyl carboxylate-based compound. More specifically, the solvent may be added in an amount of 30 parts by weight or more, or 40 parts by weight or more, and 60 parts by weight or less, or 50 parts by weight or less. When the solvent is added within the above range, a polymer can be prepared with excellent polymerization efficiency by completely dissolving the monomer materials.

In addition, the polymerization reaction of the olefin and the vinyl carboxylate-based compound may be performed at 50 to 80° C., more specifically, 50° C. or higher or 60° C. or higher, and 80° C. or lower or 70° C. or lower. There is no possibility of deterioration in polymerization efficiency due to unreacted or overreacted reactions in the above-mentioned temperature range.

The copolymer of the olefin and the vinyl carboxylate-based compound is prepared by the polymerization reaction described above, and the copolymer prepared by controlling the content of the monomer material and the preparation conditions during the preparation process may exhibit optimized weight average molecular weight, molecular weight distribution, and content of ethylene-derived structural unit.

Specifically, the copolymer of the olefin and the vinyl carboxylate-based compound may have the weight average molecular weight of 100,000 to 350,000 g/mol, more specifically 150,000 g/mol or more, or 200,000 g/mol or more, and 350,000 g/mol or less, or 320,000 g/mol or less. In addition, the molecular weight distribution (MWD) may be 1.5 to 2.5, more specifically 1.5 or more, or 1.8 or more, and 2.5 or less, or 2.2 or less. In addition, the content of the olefin-derived repeating unit may be 10 mol % or more, 15 mol % or more, 20 mol % or more, or 25 mol % or more, and 70 mol % or less, 50 mol % or less, or 45 mol % or less based on 100 mol % of a total amount of repeating units in the copolymer of an olefin-vinyl carboxylate-based compound. When having the narrow molecular weight distribution and optimized content of the olefin-derived repeating unit along with the high weight average molecular weight within the above range, it is possible to exhibit improved gas barrier properties while maintaining excellent mechanical strength properties during film production.

More specifically, the copolymer of the olefin and the vinyl carboxylate-based compound may be an ethylene-vinyl acetate copolymer satisfying the above properties.

Subsequently, in step 2, the copolymer of the olefin and the vinyl carboxylate-based compound prepared in step 1 is hydrolyzed through a saponification reaction, and an unsaturated nitrile-based compound is added when the saponification reaction proceeds at least 95% to prepare a copolymer containing a cyanoalkyl group.

The hydrolysis may be performed by adding a basic substance or a base such as sodium hydroxide. The copolymer of the olefin and the vinyl carboxylate-based compound is hydrolyzed by the saponification reaction which is carried out by adding the basic substance, and some or all of the repeating units derived from the vinyl carboxylate-based compound in the copolymer are converted into repeating units containing a hydroxyl group.

The basic substance may be added in a molar ratio of 5 to 15, more specifically 5 or more, or 7 or more, and 15 or less, or 12 or less with respect to 100 mol of the copolymer of the olefin and the vinyl carboxylate-based compound. If the basic substance is added in a molar ratio of less than 5, hydrolysis may not occur sufficiently, and if it is added in a molar ratio exceeding 15, excessive wastewater may be generated in the process of removing the catalyst, or insufficient catalyst removal may cause discoloration or protrusion of the film.

The basic substance may be added in a solution phase dissolved in an alcohol-based solvent such as methanol to increase reaction efficiency.

In addition, the hydrolysis may be performed at a temperature of 50 to 70° C., more specifically 50° C. or more, or 60° C. or more, and 70° C. or less, or 65° C. or less. When performed in the above-described temperature range, the hydrolysis may occur sufficiently at an appropriate reaction rate.

In the method according to one embodiment of the present disclosure, a cyanoalkyl group is bonded to a side chain of the copolymer to be prepared by adding an unsaturated nitrile-based compound when the saponification reaction proceeds at least 95%.

When a copolymer of an olefin and a vinyl carboxylate-based compound is prepared by using an unsaturated monomer containing a cyano group as a comonomer in order to introduce the cyanoalkyl group, a nitrile group structure is easily decomposed by the basic substance added during the saponification reaction, and there is a possibility of deterioration in physical properties of the copolymer such as inability to obtain a moisture blocking effect to be obtained.

Accordingly, in the present disclosure, a cyanoalkyl group is bonded to a side chain of the copolymer through a reaction with an unsaturated nitrile-based compound after performing a saponification reaction by a certain level or higher for the copolymer of the olefin and the vinyl carboxylate-based compound, and thus it is possible to achieve an improvement effect by the introduction of the cyanoalkyl group while maintaining excellent physical properties of the copolymer.

In addition, the timing for adding the unsaturated nitrile-based compound affects the degree of saponification and cyanoalkylation of the copolymer. As described above, the unsaturated nitrile-based compound reacts with a hydrolysis intermediate of the copolymer of an olefin-vinyl carboxylate-based compound, that is, an intermediate in which the copolymer is present as a salt of an oxy anion and a cation derived from a basic substance. Accordingly, when the content of the intermediate in the reaction system is insufficient or too large, it is difficult to satisfy the aforementioned cyanoalkyl substitution ratio. Specifically, if the degree of saponification of the copolymer is less than 95%, there is a possibility that thermal stability is deteriorated during film production by melt molding, and mechanical strength and gas barrier properties are deteriorated. Moreover, as described above, the unsaturated nitrile-based compound, acrylonitrile as a representative example, reacts with the intermediate present as the salt of an oxy anion and a cation derived from a basic substance, which is produced during hydrolysis of the copolymer of an olefin-vinyl carboxylate-based compound. Therefore, when the acrylonitrile is added as an unsaturated nitrile-based compound when the saponification reaction proceeds less than 95%, the basic substance used in the saponification reaction is previously reacted with acrylonitrile to form a side reaction product such as cyanoethanol (HO—$CH_2$—$CH_2$—CN), 2-cyanoethyl ether ((CN—$CH_2$—$CH_2$)$_2$—O), cyanohexanone or cyanoethylated acetone, and as a result, cyanoalkylation may be lowered because the intermediate is not sufficiently produced. In this case, it is difficult to obtain an effect of increasing moisture stabilization and reducing permeation of moisture due to cyanoalkylation, and more by-products are generated due to the side reaction.

After the saponification reaction is completely performed, cyanoalkyl substitution is difficult because it exist as a saponified polymer having a hydroxyl group at the terminal, not an intermediate present as a salt of an oxy anion and a cation derived from a basic substance. Accordingly, for the cyanoalkyl substitution, cationic substitution for the saponified polymer, for example, NaOH substitution by adding a basic substance such as sodium hydroxide should be preceded. However, since the saponified polymer has a low solubility in a solvent, NaOH reacts first with an unsaturated nitrile-based compound to produce side reaction products, before the saponified polymer is substituted with NaOH. Accordingly, an additional purification process for removing the side reaction products is required, and thus, a large amount of wastewater is generated.

Accordingly, the unsaturated nitrile-based compound is preferably added when the intermediate in a salt form of an oxy anion and a cation derived from a basic substance is present in an optimum content in the reaction system. Specifically, it may be added when the saponification reaction proceeds 95% or more and until completion of the saponification reaction, that is, until the saponification reaction proceeds 100%, or when the saponification reaction proceeds 95% or more and immediately before completion of the saponification reaction, that is, less than 100% or 99% or less. In this case, the generation of by-products by free NaOH may be prevented by adding an unsaturated nitrile-based compound in a situation where NaOH is substituted in the copolymer chain. More specifically, 3 hours after completion of adding the reactant for the saponification reaction, and more specifically, 3 to 4 hours after completion of adding the reactant, the unsaturated nitrile-based compound may be added.

In addition, the reaction after addition of the unsaturated nitrile-based compound may be performed such that a cyanoalkyl substitution ratio according to the Equation 1 is 2 mol % or more and less than 10 mol %.

If conditions for adding the unsaturated nitrile-based compound are not satisfied, or the cyanoalkyl substitution ratio is more than 10 mol % by further adding an additive capable of increasing a solubility of the vinyl alcohol-based copolymer and increasing the cyanoalkyl substitution ratio such as acetone, gas barrier properties may be rather reduced. In addition, if the cyanoalkyl substitution ratio is less than 2 mol %, moisture blocking effect may be weak.

More specifically, the reaction after addition of the unsaturated nitrile-based compound may be performed such that the cyanoalkyl substitution ratio according to the Equation 1 is 2.5 mol % or more, or 3 mol % or more, and 9 mol % or less, or 8 mol % or less.

In the present disclosure, the progress of the saponification reaction may be confirmed from an intensity change of peak of the functional group generated or disappeared as a result of the saponification reaction through 1H-nuclear magnetic resonance spectroscopy, and the reaction time may be estimated with the progress of the saponification reaction from the repeated analysis results. Specifically, the time at which the saponification reaction proceeds 50% is 1 hour after completion of adding the reactant, and the time at 95% is 3 hours after completion of adding the reactant.

Examples of the unsaturated nitrile-based compound include acrylonitrile, methacrylonitrile, 1-cyanopropene, and 3-cyanopropene, and any one or a mixture of two or more thereof may be used.

Further, the unsaturated nitrile-based compound may be added in an amount such that the degree of cyanoalkylation in the vinyl alcohol-based copolymer to be finally prepared, which is specifically a content of the third repeating unit containing a cyanoalkyloxy group with respect to a total amount of the second and third repeating units, is 2 mol % or more, 2.5 mol % or more, or 3 mol % or more, and 10 mol % or less, 9 mol % or less, or 8 mol % or less.

In addition, after the unsaturated nitrile-based compound is added, the reaction may be performed at a temperature of 0° C. or higher, or 40° C. or higher, and 60° C. or lower, for 2 hours or more, or 24 hours or more, and 48 hours or less, or 30 hours or less.

As a result of the above reaction, reaction product particles may be prepared in a form dispersed in a solvent.

A vinyl alcohol-based copolymer containing a cyanoalkyl group may be obtained by optionally performing a neutralization process using an acid such as acetic acid, a process of volatilizing and removing a solvent by blowing water vapor, a process of precipitating particles dispersed in water and then separating and washing the same, etc.

As the cyanoalkyl group is bonded to the side chain of the copolymer, a peak of the cyanoethyl group bonded to the side chain (—$CH_2$—CN) appears at 2.7 ppm in 1H-nuclear magnetic resonance spectroscopy.

In addition, it is possible to minimize the content of by-products in the vinyl alcohol copolymer to be prepared, as the timing for adding the cyanonitrile-based compound is controlled. Specifically, the vinyl alcohol copolymer may contain by-products in an amount of 20% or less, more specifically more than 0 wt % and 15 wt % or less, or 12 wt % or less based on a total weight of the copolymer. Herein, the by-product may be a cyano group-containing compound such as cyanoethanol, 2-cyanohexanone, cyanoethyl ether, and dicyanoethylated acetone, or a mixture thereof.

Since the vinyl alcohol-based copolymer prepared by the above-described method has a cyanoalkyl group having excellent moisture stability at the side chain, it may reduce permeation of moisture and may exhibit excellent gas barrier properties against gases such as oxygen, water vapor, carbon dioxide gas, and nitrogen even in a humid environment. Accordingly, it can be used in various applications such as films, sheets, containers, and fibers that require gas barrier properties.

According to another embodiment of the present disclosure, there are provided a composition for forming a gas barrier film including the vinyl alcohol-based copolymer and a gas barrier film.

The film may be produced according to conventional molding methods such as injection molding, compression molding, and extrusion molding. Examples of the extrusion molding include a T-die method, a blow molding method, a pipe extrusion method, a linear extrusion method, a release die extrusion method, an inflation method, and the like, and co-extrusion molding of the vinyl alcohol-based copolymer with another thermoplastic resin layer is also possible.

Therefore, the composition for forming a gas barrier film is not particularly limited as long as the vinyl alcohol-based copolymer is used as a base resin. The composition may contain components without particular limitation as long as they are used in a composition for forming a film applied to a conventional film forming method.

Further, a known additive, for example, a reinforcing material such as a glass fiber and a carbon fiber, a filler, a colorant, a stabilizer such as hydrotalcite, a foaming agent, a drying agent, a thermoplastic resin, etc., may be further added to the composition for forming a film, if necessary.

In addition, the film may be used in the form of an independent film, may be used in the form of a coating film for a substrate, or may be used in the form of a multi-layered structure with other films.

The film may be used as packaging materials such as food packaging films, sheets, cosmetic containers, gasoline tank containers, etc., because it can maintain excellent gas barrier properties even in humid conditions. Specifically, the film has a 95% RH oxygen permeability of 0.05 cc·20 $\mu m/m^2$·24 hr·atm or less, more specifically 0.03 cc·20 $\mu m/m^2$·24 hr·atm or less, and 0.001 cc·20 $\mu m/m^2$·24 hr·atm or more, or 0.01 cc·20 $\mu m/m^2$·24 hr·atm or more.

DETAILED DESCRIPTION OF THE EMBODIMENTS

Hereinafter, the function and effect of the present invention will be described in more detail through specific examples. However, these examples are for illustrative purposes only, and the invention is not intended to be limited by these examples.

The copolymers prepared in Examples and Comparative Examples were analyzed in the following manner:

(1) Weight Average Molecular Weight (Mw) and Molecular Weight Distribution (MWD; Mw/Mn)

<Analysis Condition>
Column: PL mixed B×2
Solvent: DMF/0.05M LiBr (0.45 μm filtered)
Flow rate: 1.0 ml/min
Sample concentration: 1.0 mg/ml
Injection volume: 100 μl
Column temperature: 65° C.
Detector: Refractive index detector by Waters
Standard: Polystyrene (PS) (corrected by cubic function)
6 kinds of polystyrene standard were used with the molecular weight (g/mol) of 9,600/31,420/113,300/327,300/1,270,000/4,230,000.
Data processing:
1) A copolymer sample was dissolved in dimethylformamide (DMF) at a concentration of 1 mg/ml and filtered through a 0.45 μm syringe filter. 2) GPC chromatogram was obtained by injecting the sample solution. 3) GPC chromatogram was obtained by injecting a standard solution. 4) A calibration curve and an equation were obtained from the chromatogram of the standard solution, and a retention time of the sample solution was substituted into the equation to obtain a weight average molecular weight and a number average molecular weight of the sample, respectively. A molecular weight distribution (Mw/Mn) was calculated from the weight average molecular weight (Mw) and the number average molecular weight (Mn).

(2) Cyanoethyl Substitution Ratio

The cyanoethyl substitution ratio of the prepared copolymer was derived by obtaining a nitrogen content by the Kjeldahl method, and calculating the cyanoethyl substitution ratio, which is a content of the third repeating unit (mol %) containing a cyanoalkyloxy group with respect to 100 mol % of a total amount of the second repeating unit containing a hydroxyl group and the third repeating unit containing a cyanoalkyloxy group in the vinyl alcohol-based copolymer to be finally produced, from the value according to the following Equation 1.

Cyanoalkyl substitution ratio=[(mol % of third repeating unit)/(mol % of second repeating unit+mol % of third repeating unit)]×100    [Equation 1]

In Equation 1, the mol % of the second repeating unit and the mol % of the third repeating unit are values based on 100 mol % of a total amount of repeating units in the vinyl alcohol-based copolymer to be finally produced.

(3) Content of ethylene-derived repeating unit in copolymer: After dissolving a sample in a tetrahydrofuran solvent (THF-d8), 1H-NMR spectrum was measured at room temperature using a Bruker Avance III HD 700 Mhz 1H-NMR analyzer. As 4 protons of ethylene monomer and 5 protons of vinyl acetate (VA) monomer appeared at peaks between 0.74 and 2.1 ppm, and one proton of VA monomer appeared at 4.78 ppm, the content (mol %) of ethylene-derived repeating unit in the copolymer was determined using the following Equation 2.

Content of ethylene-derived repeating unit (mol %)= $[r/(r+1)] \times 100$    [Equation 2]

In Equation 2, $$r = \frac{n(\text{ethylene})}{n(Vac)} = \frac{I_{0.74-2.1\ ppm} - 5I_{4.78\ ppm}}{4I_{4.78\ ppm}},$$

wherein n(ethylene) is a molar content of ethylene-derived repeating unit, n(VAc) is a molar content of vinyl acetate-derived repeating unit, $I_{0.74-2.1\ ppm}$ is an integral value of a peak area appearing between 0.74 and 2.1 ppm, and $I_{4.78\ ppm}$ is an integral value of a peak area appearing at 4.78 ppm.

(4) 95% RH oxygen permeability: MOCON OX-TRAN 2/20 manufactured by Modern Control was used for measuring the oxygen permeability. The oxygen permeability (unit: cc·20 μm/m²·24 hr·atm) was measured for 5 samples taken at arbitrary positions on the film under the conditions of a temperature of 20° C., a humidity of 95% RH and an oxygen pressure of 2.5 kg/cm², and the minimum value of these was listed as the oxygen permeability.

Preparation of Vinyl Alcohol-Based Copolymer

Example 1-1

Step 1

After mixing 8.9 mol % of ethylene and 91.1 mol % of vinyl acetate, 45 parts by weight of t-butanol based on 100 parts by weight of a total amount of ethylene and vinyl acetate as a solvent and 0.043 mol of 2,2'-azobis(2,4-dimethylvaleronitrile) (ADMVN) based on 100 mol of a total amount of ethylene and vinyl acetate as an initiator were used to copolymerize at 60 to 70° C. The solvent and unreacted substances were volatilized and removed from the resulting polymerization solution to obtain an ethylene-vinyl acetate copolymer.

The obtained ethylene-vinyl acetate polymer had a Mw of 263,000 g/mol, a molecular weight distribution (MWD) of 2.09, and a content of ethylene-derived repeating unit in the copolymer of 27.6 mol %.

Step 2

After 20 g of the ethylene-vinyl acetate copolymer prepared in step 1 was dissolved in 180 g of methanol to make a 10% concentration solution, a sodium hydroxide catalyst was dissolved in 180 g of methanol in a content of 9 mol with respect to 100 mol of the copolymer, and then added to perform hydrolysis at 60° C. Subsequently, 10 g of acrylonitrile was added 3 hours after completion of adding the reactant, at which the saponification reaction was confirmed to proceed at least 95%, and the reaction was performed at 60° C. for 24 hours.

After completion of the reaction, the reaction solution was neutralized with acetic acid, and water vapor was blown to volatilize alcohol, followed by precipitation of particles dispersed in water. The obtained particles were washed with a large amount of water, and then dried to obtain a vinyl alcohol-based copolymer containing a 2-cyanoethyl group.

Example 1-2

After 20 g of the polymer prepared in step 1 of Example 1-1 was dissolved in 180 g of methanol to make a 10% concentration solution, a sodium hydroxide catalyst was dissolved in 180 g of methanol in a content of 9 mol with respect to 100 mol of the polymer, and then added to perform hydrolysis at 60° C. Subsequently, 5 g of acrylonitrile was added 3 hours after completion of adding the reactant, at which the saponification reaction was confirmed to proceed at least 95%, and the reaction was performed at 60° C. for 24 hours.

After completion of the reaction, the reaction solution was neutralized with acetic acid, and water vapor was blown to volatilize alcohol, followed by precipitation of particles dispersed in water. The obtained particles were washed with a large amount of water, and then dried to obtain a vinyl alcohol-based copolymer containing a 2-cyanoethyl group.

Example 1-3

Step 1

After mixing 18.5 mol % of ethylene and 81.5 mol % of vinyl acetate, 45 parts by weight of t-butanol based on 100 parts by weight of a total amount of ethylene and vinyl acetate as a solvent and 0.048 mol of 2,2'-azobis(2,4-dimethylvaleronitrile) (ADMVN) based on 100 mol of a total amount of ethylene and vinyl acetate as an initiator were used to copolymerize at 60 to 70° C. The solvent and unreacted substances were volatilized and removed from the resulting polymerization solution to obtain an ethylene-vinyl acetate copolymer.

The obtained ethylene-vinyl acetate polymer had a Mw of 240,000 g/mol, a molecular weight distribution (MWD) of 2.1, and a content of ethylene-derived repeating unit in the copolymer of 44.1 mol %.

Step 2

After 20 g of the ethylene-vinyl acetate copolymer prepared in step 1 was dissolved in 180 g of methanol to make a 10% concentration solution, a sodium hydroxide catalyst was dissolved in 180 g of methanol in a content of 9 mol with respect to 100 mol of the copolymer, and then added to perform hydrolysis at 60° C. Subsequently, 10 g of acrylonitrile was added 3 hours after completion of adding the reactant, at which the saponification reaction was confirmed to proceed at least 95%, and the reaction was performed at 60° C. for 24 hours.

After completion of the reaction, the reaction solution was neutralized with acetic acid, and water vapor was blown to volatilize alcohol, followed by precipitation of particles dispersed in water. The obtained particles were washed with a large amount of water, and then dried to obtain a vinyl alcohol-based copolymer containing a 2-cyanoethyl group.

Comparative Example 1-1

After 20 g of the copolymer prepared in step 1 of Example 1-1 was dissolved in 180 g of methanol to make a 10% concentration solution, a sodium hydroxide catalyst was dissolved in 180 g of methanol in a content of 9 mol with respect to 100 mol of the copolymer, and then added to perform hydrolysis at 60° C. Subsequently, 10 g of acrylonitrile was added 3 hours after completion of adding the reactant, at which the saponification reaction was confirmed to proceed at least 95%, while gradually adding acetone for increasing the solubility of the copolymer and the substitution ratio, and the reaction was performed at 60° C. for 24 hours.

After completion of the reaction, the reaction solution was neutralized with acetic acid, and water vapor was blown to volatilize alcohol, followed by precipitation of particles dispersed in water. The obtained particles were washed with a large amount of water, and then dried to obtain a vinyl alcohol-based copolymer containing a 2-cyanoethyl group.

Comparative Example 1-2

After 20 g of the polymer prepared in step 1 of Example 1-1 was dissolved in 180 g of methanol to make a 10% concentration solution, a sodium hydroxide catalyst was dissolved in 180 g of methanol in a content of 9 mol with respect to 100 mol of the polymer, and then added to perform hydrolysis at 60° C.

After completion of the reaction, the reaction solution was neutralized with acetic acid, and water vapor was blown to volatilize alcohol, followed by precipitation of particles dispersed in water. The obtained particles were washed with a large amount of water, and then dried to obtain a vinyl alcohol-based copolymer.

Comparative Example 1-3

After 20 g of the polymer prepared in step 1 of Example 1-1 was dissolved in 180 g of methanol to make a 10% concentration solution, a sodium hydroxide catalyst was dissolved in 180 g of methanol in a content of 9 mol with respect to 100 mol of the polymer, and then added to perform hydrolysis at 60° C. Subsequently, 5 g of acrylonitrile was added 1 hour after completion of adding the reactant, at which the saponification reaction was confirmed to proceed about 50%, and the reaction was performed at 60° C. for 24 hours.

After completion of the reaction, the reaction solution was neutralized with acetic acid, and water vapor was blown to volatilize alcohol, followed by precipitation of particles dispersed in water. The obtained particles were washed with a large amount of water, and then dried to obtain a vinyl alcohol-based copolymer containing a 2-cyanoethyl group.

Comparative Example 1-4

After 20 g of the copolymer prepared in step 1 of Example 1-1 was dissolved in 180 g of methanol to make a 10% concentration solution, a sodium hydroxide catalyst was dissolved in 180 g of methanol in a content of 9 mol with respect to 100 mol of the copolymer, and then added to perform hydrolysis at 60° C. Subsequently, 5 g of acrylonitrile was added 3 hours after completion of adding the reactant, at which the saponification reaction was confirmed to proceed at least 95%, while gradually adding acetone for increasing the solubility of the copolymer and the substitution ratio, and the reaction was performed at 60° C. for 24 hours.

After completion of the reaction, the reaction solution was neutralized with acetic acid, and water vapor was blown to volatilize alcohol, followed by precipitation of particles dispersed in water. The obtained particles were washed with a large amount of water, and then dried to obtain a vinyl alcohol-based copolymer containing a 2-cyanoethyl group.

Comparative Example 1-5

A sodium hydroxide catalyst was dissolved in 30 g of water in a content of 9 mol with respect to 100 mol of the vinyl alcohol-based copolymer prepared in Comparative Example 1-2. While stirring the resulting solution, 10 g of acrylonitrile and 20 g of the vinyl alcohol-based copolymer prepared in Comparative Example 1-2 were added and reacted at 60° C. for 5 hours. At this time, the vinyl alcohol-based copolymer was made into a film, cut into small pieces, and then gradually added thereto.

After completion of the reaction, the reaction solution was neutralized with acetic acid. Thereafter, the reaction residue was volatilized under vacuum, dissolved in acetone and precipitated in water to obtain particles. The obtained particles were washed with a large amount of water, and then dried to obtain a vinyl alcohol-based copolymer containing a 2-cyanoethyl group.

Preparation of Film

Example 2-1

A film was prepared using the vinyl alcohol-based copolymer containing a 2-cyanoethyl group prepared in Example 1-1 above.

Specifically, 0.5 g of the vinyl alcohol-based copolymer of Example 1-1 was compressed at 190° C. for 3 minutes using a compression molding machine to prepare a film.

Examples 2-2 to 2-3 and Comparative Examples 2-1 to 2-5

Films were prepared in the same manner as in Example 2-1, except that one of the vinyl alcohol-based copolymers prepared in Examples 1-2 to 2-3 and Comparative Examples 1-1 to 1-5 was used.

Experimental Example 1

1H-nuclear magnetic resonance spectroscopy analysis was performed on the vinyl alcohol-based copolymer prepared in Example 1-1.

As a result, a peak of the cyanoethyl group bonded to the side chain (—$CH_2$—CN) of the vinyl alcohol-based copolymer appeared at 2.7 ppm, and the proton peak of —$CH_2$—CN was observed to be higher than the proton peak of —$CH_2$—CN, which usually appears when acrylonitrile is polymerized as a comonomer. This difference in peak structure is because the amount of proton in —$CH_2$—CN is twice as large as —CH(CN)—.

Experimental Example 2

10 g of the vinyl alcohol-based copolymer prepared in each of Examples and Comparative Examples was added together with 100 g of toluene, and stirred for 1 hour at 70° C. Thereafter, the copolymer was removed, and GC (Gas Chromatography) analysis was performed on by-products dissolved in the toluene layer. Then, a content of by-product was estimated from a relative area of each by-product peak based on the toluene peak.

<Experiment Method>

A sample, which is a stock solution, was analyzed by GC/MS (EQC-0291) under the following conditions, and toluene was used as a standard solution.

Column: HP-5MS (0.25 mm ID×30 mL, 0.25 m d.f. capillary)
Injector: split/splitless
Gas Flow rate: Column (He): 1 mL/min
Oven temperature: Initial Value & Time: 50° C., 5 min
Program Rate: 15° C./min
Final Value & Time: 300° C., 20 min
Injector temperature: 300° C.
Interface temperature: 300° C.
Ionization mode: EI
Mass range: 20-700 m/z
Injector Split ratio: 1/100
Injection volume: 0.2 μL

TABLE 1

| Type of by-product | Cyano-ethanol | Cyanohexanone | 2-Cyanoethyl ether | Dicyanoethylated acetone |
|---|---|---|---|---|
| Example 1-1 | 5 | 5 | 5 | 5 |
| Example 1-2 | 4 | 3 | 5 | 0 |
| Comp. Ex. 1-1 | 5 | 6 | 5 | 7 |
| Comp. Ex. 1-3 | 57 | 48 | 60 | 56 |
| Comp. Ex. 1-5 | 105 | 108 | 130 | 120 |

In Table 1, the content of each by-product is in wt % based on a total weight of the vinyl alcohol copolymer.

As a result of the experiment, in the case of Comparative Example 1-3 in which acrylonitrile was added when the saponification reaction proceeded 50% and Comparative Examples 1-5 using a polymer in which the saponification reaction was already completed, the amount of by-products generated was greatly increased, compared to Examples 1-1, 1-2 and Comparative Example 1-1 in which acrylonitrile was added when the saponification reaction proceeded at least 95%.

From this, it could be confirmed that the amount of by-products generated can be reduced by controlling the timing for adding the acrylonitrile.

Experimental Example 3

The cyanoethyl substitution ratio of each copolymer used in preparing the films of Examples 2-1 to 2-3 and Comparative Examples 2-1 to 2-5 was calculated. The results are shown in Table 2 below.

In addition, oxygen permeability was measured for the films prepared in Examples 2-1 to 2-3 and Comparative Examples 2-1 to 2-5, and the results are shown in Table 2 below.

TABLE 2

| | Examples | | | Comparative Examples | | | | |
|---|---|---|---|---|---|---|---|---|
| | 2-1 | 2-2 | 2-3 | 2-1 | 2-2 | 2-3 | 2-4 | 2-5 |
| Type of copolymer | Ex. 1-1 | Ex. 1-2 | Ex. 1-3 | Comp. Ex. 1-1 | Comp. Ex. 1-2 | Comp. Ex. 1-3 | Comp. Ex. 1-4 | Comp. Ex. 1-5 |
| Cyanoethyl substitution ratio (mol %) | 8 | 3 | 7 | 19 | 0 | 1 | 11 | 10 |
| Content of ethylene-derived repeating unit (mol %) | 27.6 | 27.6 | 44.1 | 27.6 | 27.6 | 27.6 | 27.6 | 27.6 |
| 95% RH oxygen permeability (cc · 20 μm/m² · 24 hr · atm) | 0.02 | 0.01 | 0.03 | 0.14 | 0.08 | — | 0.12 | 0.18 |

In Table 2, the content of ethylene-derived repeating unit is based on 100 mol % of a total amount of repeating units constituting the vinyl alcohol-based copolymer.

Also, "-" means that it was not measured.

The films of Examples 2-1 to 2-3 prepared using the copolymer containing a cyanoethyl group according to the present disclosure exhibited excellent oxygen barrier properties even in a humid environment due to improved hygroscopicity, compared to Comparative Examples 2-1 to 2-5. From this, it could be confirmed that the films are useful as a packaging material in a humid environment.

The invention claimed is:

1. A gas barrier film comprising a vinyl alcohol-based copolymer, wherein the vinyl alcohol-based copolymer comprises a first repeating unit derived from ethylene; a second repeating unit represented by Chemical Formula 1 containing a hydroxyl group; and a third repeating unit represented by Chemical Formula 2 containing a cyanoalkyloxy group;

wherein the first repeating unit is included in an amount of 25 to 45 mol % with respect to 100 mol % of a total amount of repeating units in the vinyl alcohol-based copolymer, and wherein the third repeating unit is comprised in an amount of 3 mol % to 8 mol % with respect to 100 mol % of a total amount of the second repeating unit and the third repeating unit in the vinyl alcohol-based copolymer, wherein the vinyl alcohol-based copolymer further comprises a cyano group-containing compound in an amount of more than 0 wt % and 20 wt % or less, and the cyano group-containing compound comprises cyanoethanol, 2-cyanohexanone, cyanoethyl ether, dicyanoethylated acetone, or a mixture thereof, and wherein the gas barrier film has a 95% RH oxygen permeability of 0.05 cc·20 μm/m2·24 hr. atm or less,

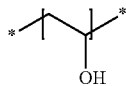

[Chemical Formula 1]

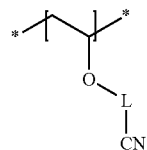

[Chemical Formula 2]

in Chemical Formula 2, L is ethylene.

2. The gas barrier film of claim 1, wherein the first repeating unit further includes at least one repeating unit derived from propylene, butylene, pentene, hexene, or octene.

3. The gas barrier film of claim 1, wherein the vinyl alcohol-based copolymer further comprises a repeating unit derived from a vinyl carboxylate-based compound.

4. The gas barrier film of claim 3, wherein the vinyl carboxylate-based compound is vinyl acetate.

5. The gas barrier film of claim 3, wherein the repeating unit derived from a vinyl carboxylate-based compound is included in an amount of 1 mol % or less and 0.1 mol % or more, with respect to 100 mol % of the total amount of repeating units in the vinyl alcohol-based copolymer.

* * * * *